Jan. 27, 1948.  R. P. KROON  2,434,935
TURBINE APPARATUS
Filed Feb. 8, 1946
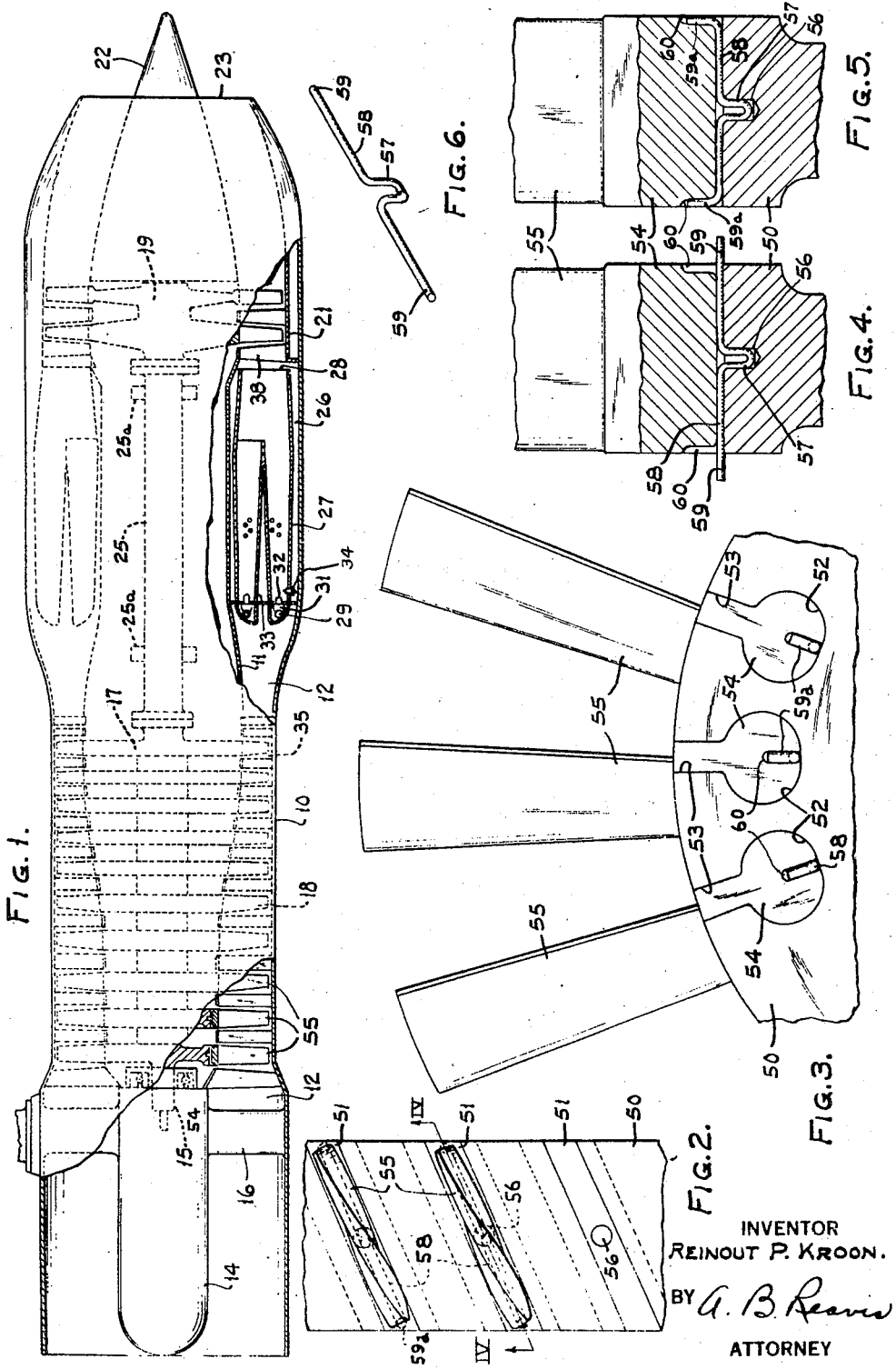
INVENTOR
REINOUT P. KROON.
BY *A. B. Reaves*
ATTORNEY Patented Jan. 27, 1948

2,434,935

UNITED STATES PATENT OFFICE 2,434,935

TURBINE APPARATUS

Reinout P. Kroon, Swarthmore, Pa., assignor to Westinghouse Electric Corporation, East Pittsburgh, Pa., a corporation of Pennsylvania Application February 8, 1946, Serial No. 646,427

4 Claims. (Cl. 253—77)

This invention relates to blading, more particularly to blading of the side entry type for use in elastic fluid utilizing apparatus, and has for an object to provide improved fastening means for blading of this character.

Another object of the invention is to provide novel securing means for retaining a side entry blade in its mating rotor groove, which securing means can be released and the blade removed without affecting the securing means for other blades.

Another object of the invention is to provide novel securing means for side entry blades of elastic fluid utilizing apparatus, which securing means can be released to permit removal of and reinsertion of any desired blade without disturbing adjacent blades.

While blade-fastening means of the character hereinafter disclosed will be found useful in many situations and types of apparatus, they are particularly useful in compressor and turbine apparatus for gas turbine power plants.

A typical power plant of the type referred to is disclosed in the copending application of Stewart Way, Serial No. 482,533, filed April 10, 1943, Patent No. 2,405,723, dated August 13, 1946, wherein there is described a gas turbine power plant for propulsion of aircraft, and includes an air compressor, air heating apparatus, a turbine, and a propulsion jet nozzle all housed within a streamlined tubular casing. A plant of this character is particularly suitable for propelling aircraft at high speeds and operates generally as follows: Air enters the forward end of the tubular casing and is compressed in the compressor, the compressed air is then heated in the heating apparatus by combustion of fuel supported by the compressed air. The resulting motive fluid, comprising the products of combustion and the excess compressed air, drives the turbine and is then discharged through the propulsion nozzle as a jet, the reaction of which serves to propel the aircraft. The turbine extracts at least sufficient power from the motive fluid to drive the compressor and auxiliaries. The fuel is supplied to the air heating apparatus, under the control of a throttle valve, by suitable means, for example, a positive displacement pump which is preferably driven by the turbine.

These and other objects are effected by the invention as will be apparent from the following description and claims taken in connection with the accompanying drawings, forming a part of this application, in which:

Fig. 1 is a longitudinal view of apparatus embodying the present invention, portions of the apparatus being broken away for the sake of clearness;

Fig. 2 is a fragmentary plan view of a compressor disc showing two grooves with blades mounted therein and a third groove with the blade omitted;

Fig. 3 is a fragmentary side elevational view of the compressor disc shown in Fig. 2 but with blades positioned in all three of the grooves;

Fig. 4 is a fragmentary vertical sectional view taken along the line IV—IV of Fig. 2, looking in the direction indicated by the arrows, and showing the securing means in an intermediate position of assembly;

Fig. 5 is a view similar to Fig. 4, showing the securing means in fully assembled position; and Fig. 6 is a perspective view of the securing means prior to assembly with a blade and its groove.

The power plant shown in Fig. 1 comprises, in general, an outer casing structure 10, open from end to end, and having a central core structure 11 providing an annular flow passage 12, which extends fore and aft with respect to the aircraft in which it is mounted. The central core structure 11 is supported by the casing structure along its longitudinal axis and includes a hollow fairing cone 14 defining with the forward or left end of the casing 10, as viewed in Fig. 1, the inlet portion of the flow passage 12. The fairing cone houses a fuel pump, generally indicated 15, and other auxiliary apparatus, for example, fuel controls 15a, and is supported from the casing by hollow compressor guide vanes 16. The core structure also includes the rotor 17 of an axial-flow compressor 18 the fixed blades of which are carried by the casing 10, the rotor 19 of a turbine 21, and a conical tailpiece 22 which defines, with the rear end of the casing structure, a propulsion nozzle 23. The intermediate portion of the core structure between the compressor and the turbine comprises an inner wall structure 24, which houses a shaft 25 connecting the turbine rotor 19 and compressor rotor 17, and defines with the casing 10 an annular combustion chamber 26. The shaft 25 is journaled in suitable bearings 25a, carried by the outer casing.

The combustion chamber 26 is provided with a suitable burner or burners, such as shown in the copending application of Way et al., Serial No. 511,468, filed November 23, 1943, for heating the air compressed by the compressor. In the embodiment shown herein, a perforated, tapered, annular burner tube 27 is mounted in the annular combustion chamber 26 with its large open end 28 directed downstream. Fuel under pressure is supplied to the burner tube from a manifold pipe 29 connected to a fuel supply and is fed from the manifold through branch pipes 31 to atomizing nozzles 32 extending into the burner tube through a small closed end 33 thereof. Suitable means, including spark plugs 34 extending into the burner tube, are provided for igniting the air-fuel mixture.

The power plant operates substantially as follows: Air enters the casing 10 at the inlet of the flow passage 12, is compressed by the compressor, and flows into a diffuser or divergent portion 35 of the flow passage, which effects a further compression of the air. The compressed air then passes through the openings provided in the walls of the burner tube 27. The compressed air mixes with the fuel atomized in the tube by the nozzles 32. The air and fuel mixture is ignited by the spark plugs and burns steadily thereafter. The hot gases or motive fluid comprising the products of combustion and the excess air heated by the combustion, on leaving the burner tube 27 are directed by fixed guide vanes or nozzles 38, of the turbine 21, into the blade passage of the turbine rotor 19. The turbine extracts at least sufficient energy from the motive fluid to drive the compressor 18, pump 15, fuel controls 15a, and other auxiliary apparatus that may be housed in the fairing cone 14. The spent gases leaving the turbine are discharged through the propulsion nozzle 23 at a high ve'ocity, so that the remaining energy in the motive fluid is available to propel the aircraft. The tailpiece 22 is preferably axially movable with respect to the casing structure so that the back pressure on the turbine and the jet effect produced by the nozzle may be varied.

The present invention is particularly concerned with the novel means employed for preventing axial displacement of the compressor and/or turbine b'ades with respect to their mounting grooves in their rotor discs.

Referring now in detail to Figs. 2 to 6, inclusive, there is shown, at 50, a rotor disc provided with an annular series of the grooves 51 extending generally transversely thereof, each groove comprising an inner enlarged portion 52 and an outer narrower neck-like portion 53 connecting the larger portion 52 with the periphery of the disc 50. This type of groove is frequently referred to in the elastic fluid industries as the "keyhole" type of groove.

Each groove 51 has positioned therein the mating root portion 54 of a blade 55, and to prevent movement of the blade and its root longitudinally of the groove there is provided the novel locking or securing means now to be described.

Each groove 51 is provided. intermediate its ends, and preferably in its innermost wall, with a recess 56 for reception of a loop or lug 57 formed as a radial projection at an intermediate portion of a piece of wire 58, the loop or lug being formed by a pair of right-angle bends in an intermediate portion of the wire, joined by a U-bend. Either the bottom wall of the groove 51 or the inner end of the blade root 54 may be provided with a longitudinally-extending recess or groove for reception of the wire 58 (Figs. 4 and 5). The wire 58 is of such length that its terminal portions 59 project beyond the sides of the disc 50 to provide blade-securing portions adapted to be bent at right angles in a direction away from the lug or loop 57 into abutting relation with the opposite ends of the root portion 54. In order that the root-engaging portions 59 of the wire-securing means will not project beyond the side walls of the disc 50, it is preferred that the blade root 54 be provided with radial recesses 60 (Figs. 4 and 5) for reception of the wire terminal portions 59 when they are bent into blade root-engaging position, as shown in Fig. 5.

It will be apparent that any blade may be easily removed without disturbing any other blades simply by straightening one of the bent securing terminal portions 59 and sliding the blade out of the groove with the locking wire left in place. If the strength of the wire has not been adversely affected by the two bending operations of fastening and releasing the terminal portions 59, the same wire may again be used to fasten the replaced blade or a new securing member 58 may be easily placed in the bottom of the groove before the new blade is inserted.

While I have shown the invention in but one form, it will be obvious to those skilled in the art that it is not so limited, but is susceptible of various changes and modifications without departing from the spirit thereof.

What is claimed is:

1. For use in elastic fluid utilizing apparatus having rooted blades whose roots are disposed in transverse grooves in a rotor; a member for securing a blade element in its rotor groove element, said member comprising an elongated body adapted to be positioned in a groove between a wall thereof and the blade root and having a lateral projection intermediate its ends for reception in a mating recess in one of said elements, whereby the member may be held against movement longitudinally, the body being of greater length than the groove in which it is adapted to be positioned. whereby its terminal portions extend therebeyond, said terminal portions being deformable whereby they may be bent to abut the opposite sides of the other of said elements.

2. In an elastic fluid utilizing apparatus a rotor having an annular row of blade-holding grooves which extend generally transversely of said row, said rotor having a recess opening through a wall of each groove, blades having root portions disposed in said grooves, and a retaining member for each of said blades, each of said retaining members comprising an elongated body portion extending lengthwise of the groove with its terminal portions extending substantially at right angles to the body portion and abutting the opposite sides of the blade root, said body portion having a lug extending laterally therefrom and positioned in the recess in the groove wall for locking the retaining member, and hence the blade, against movement longitudinally of the groove.

3. In elastic fluid utilizing apparatus a rotor having an annular row of blade-holding grooves which extend generally transversely of said row; blades having root portions disposed in said grooves, said rotor having a recess opening through a wall of each groove; and a blade-retaining member in each groove, said member comprising a length of wire formed with a lateral projection intermediate its ends received in the recess in the groove wall, the terminal portions of said wire being of a length to extend beyond the ends of the blade root and being bent at substantially right angles to abut the opposite sides of said blade root.

4. For u<e in elastic fluid utilizing apparatus having an annular row of rooted blades whose roots are disposed in grooves in a rotor and which grooves are generally transverse to said annular row, a member for securing a blade first member in its rotor second member groove and comprising a piece of wire having a pair of spaced right-angle bends joined by a U-bend to provide a laterally-projecting lug intermediate its ends for reception in a mating recess in one of said members, the terminal portions of the wire member being deformable, whereby they may be bent at substantially right angles to abut the opposite sides of the other of said members.

REINOUT P. KROON.

REFERENCES CITED

The following references are of record in the file of this patent:

UNITED STATES PATENTS

| Number | Name | Date |
| --- | --- | --- |
| 1,619,133 | Kasley | Mar. 1, 1927 |
| 2,225,769 | Conrad | Dec. 24, 1940 |
| 2,317,338 | Rydmark | Apr. 20, 1943 |
| 883,890 | Kieser | Apr. 7, 1908 |

FOREIGN PATENTS

| Number | Country | Date |
| --- | --- | --- |
| 15,893 | Great Britain | 1908 |
| 212,333 | Germany | July 29, 1909 |
| 312,864 | Italy | Nov. 28, 1933 |